United States Patent [19]

Bonutti

[11] Patent Number: 4,750,457

[45] Date of Patent: Jun. 14, 1988

[54] AUTOMOBILE ENGINE CUP PLUG AND ASSEMBLY METHOD

[75] Inventor: Henrik Bonutti, Bloomfield Hills, Mich.

[73] Assignee: Loctite Corporation, Newington, Conn.

[21] Appl. No.: 937,198

[22] Filed: Dec. 2, 1986

[51] Int. Cl.$^4$ ............................................. F01P 11/14
[52] U.S. Cl. .......................... 123/198 D; 123/41.15; 29/458; 156/92
[58] Field of Search ...................... 123/198 D, 41.15; 29/156.4 R, 458, 525, 527.2; 156/92, 293; 220/307, 288, DIG. 19; 277/1; 138/89, 90, 91, 96 R

[56] References Cited

U.S. PATENT DOCUMENTS

| | | | |
|---|---|---|---|
| 2,963,009 | 12/1960 | Dolza | 123/55 US |
| 3,489,599 | 1/1970 | Krieble. | |
| 3,547,851 | 12/1970 | Frauenglass. | |
| 3,625,875 | 12/1971 | Frauenglass. | |
| 3,757,828 | 9/1973 | Frauenglass et al. | |
| 3,807,744 | 4/1974 | Gibling | 138/96 X |
| 3,814,156 | 6/1974 | Bachmann et al. | |
| 3,826,673 | 7/1974 | Batson et al. | |
| 3,889,841 | 6/1975 | Edmonds | 123/41.15 X |
| 3,922,449 | 11/1975 | Bolger. | |
| 3,960,637 | 6/1976 | Ostrow | 156/293 |
| 4,081,012 | 3/1978 | Wallace. | |
| 4,325,985 | 4/1982 | Wallace. | |
| 4,328,983 | 5/1982 | Gibson | 29/525 X |
| 4,417,028 | 2/1985 | Azevedo. | |
| 4,428,982 | 1/1984 | Wallace. | |
| 4,497,916 | 2/1985 | Cooke et al. | |
| 4,543,698 | 10/1985 | Plantureux | 29/525 X |
| 4,589,187 | 5/1986 | Stone et al. | 29/458 |
| 4,632,944 | 12/1986 | Thompson | 522/11 |

FOREIGN PATENT DOCUMENTS

| | | | |
|---|---|---|---|
| 895477 | 1/1945 | France | 220/288 |
| 119970 | 7/1982 | Japan. | |

OTHER PUBLICATIONS

Product Data Sheet dated 9-1-76 for Scotch-Grip ®, 2353, (3 pages).
Undated product data sheet for Scotch-Grip ® (7 pages), 2451.
Undated product data sheet for Scotch-Grip ® Fastener Adhesive 2353 (16 pages).
SPS Laboratory Report No. 1697, "SPS Self Locking Screw with Scotch Grip Brand Fastener Adhesive", 12-2-68 (49 pages).
Undated product data sheet for N D Industries Epoxy-Lock and VC-3 ® Vibral-Title (5 pages).

*Primary Examiner*—Tony M. Argenbright
*Assistant Examiner*—Eric R. Carlberg
*Attorney, Agent, or Firm*—Vidas & Arrett

[57] ABSTRACT

An improvement in a process for the press fit assembly of two parts having an interference fit, wherein one of the two parts is provided with a grooved surface. A pre-applied dry to-the-touch sealant, adapted to be cured upon assembly of the two parts, is applied on the grooves prior to assembly.

9 Claims, 1 Drawing Sheet

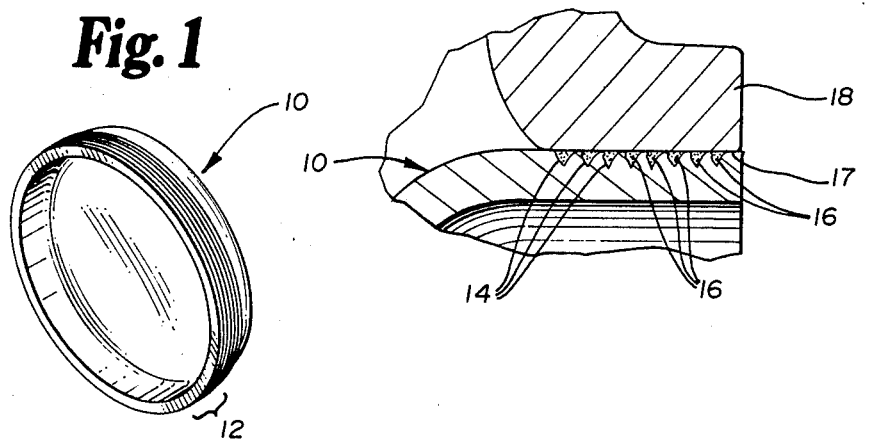

AUTOMOBILE ENGINE CUP PLUG AND ASSEMBLY METHOD

BACKGROUND OF THE INVENTION

Since the pioneering invention by Vernon Krieble in the 1950s, anaerobic adhesives have been used as thread lockers. Early on, the unique property of these adhesives to cure on exclusion of air was recognized as especially suited for automated application of an adhesive to a nut, bolt or pipe thread long prior to assembly. In order to practically manufacture and handle such articles, however, the early liquid adhesive formulation had to be modified so that it could stay in place after application in an essentially tack-free condition. A variety of formulations have been invented which achieve this objective. The various approaches include dissolving or dispersing the liquid anaerobic formulation into a thermoplastic matrix; coating the liquid adhesive with a solid polymer shell; or entraining the anaerobic adhesive in a solid film laid down from an emulsion or a solvent solution.

Competition for these pre-applied thread locking formulations comes from other adhesive systems which mimic the cure-on-assembly feature of anaerobic adhesives. The competitive adhesives are essentially two part materials, kept separate from each other on the part but mixed on assembly. Most typically, this involves encapsulating a component of the cure system of the adhesive in microcapsules which are then dispersed throughout the body of the adhesive. Upon assembly of the parts the microcapsule is broken and the cure component blended with the remaining ingredients of the adhesive. Epoxy adhesives, and acrylic 2adhesives using cure systems which are too active to be oxygen stabilized, are the most common of these types of adhesives. Other common two part adhesive systems may also be used such as urethane adhesive systems. condensation cured silicones, or hydrosilation cured silicones.

For the purposes of this application these various adhesive or sealant formulations, which can be pre-applied to a substrate to produce a substantially dry-to-the-touch formulation adapted to cure upon assembly of the substrate with a mating substrate will be referred to generally as "pre-applied" adhesives or sealants. References disclosing pre-applied adhesive or sealant formulations include U.S. Pat. Nos. 3,489,599, 3,547,851, 3,625,875, 3,757,828, 3,814,156, 3,826,673, 3,922,449, 4,417,028, 4,497,916, and 4,632,944 all assigned to Loctite Corporation or Loctite (Ireland) Ltd.; and U.S. Pat. Nos. 4,325,985, and 4,428,982, both assigned to Oakland Corporation.

Although pre-applied adhesives have found their predominant use on threaded surfaces such as fasteners or pipes, they may also be used on articles such as rivets or flat mated surfaces.

Liquid anaerobic sealants have also been used to provide gas and liquid tight seals between interference fitted parts. In the mid 70s automobile engine manufacturers began using liquid anaerobic sealants to seal engine cup-plugs (sometimes also called engine core plugs or ice plugs) used to seal holes in the side of engine castings. The holes are placed in the engine casting so that the core sand can be removed from the castings during manufacturing. The plugs are usually made from stamped sheet metal in the shape of a shallow cup. They are press-fitted into the engine holes with a typical designed interference fit of 0.006–0.012 inches. The liquid anaerobic sealant is typically applied to the holes in the engine block just prior to assembly. The liquid adhesives were found not only to effectively seal leaks but also to substantially increase the average blow-out strength of the plugs.

For a number of years now automotive manufacturers have been asking for a pre-applied product which can be used instead of the liquid products currently used for cup plug sealing. Numerous attempts have been made by various manufacturers that develop such a product. To date all have failed when it came to interference fits because the pre-applied resin on the periphery of the cup plug is shaved off at the interference point.

SUMMARY OF THE INVENTION

The present invention, in one aspect, is a method of assembling interference fitted parts, especially automotive engine cup plug assemblies, using pre-applied adhesives or sealants. In particular, the invention is an improvement in a process for press fit assembling of two parts having respective mating male and female portions adapted to be press-fitted together with an interference fit wherein one of the said male or female portions has a curable sealant material thereon adapted to cure after assembly of the two parts, in which the improvement comprises that one of said mating parts includes a plurality of circumferential grooves thereon, each said groove having an outer ridge dimension and an inner valley dimension, the ridge dimension of which overlaps the dimension of the other said mating part and the valley dimension of which does not overlap the dimension of said other mating part; that the said sealant is carried on said grooved part in said grooves; and that the sealant material is a pre-applied storage-stable substantially dry-to-the-touch formulation adapted to cure upon assembly of the two parts. Generally it is preferred that the male part carry the grooves.

Another aspect of the invention is an article of manufacture comprising a generally cylindrical part adapted to be press-fitted into a smooth mating bore, the cylindrical part having a plurality of circumferential grooves thereon, the grooves having an outer dimension which overlaps the dimension of the bore and an inner dimension which does not overlap the bore dimension, the article having a pre-applied storage-stable substantially dry-to-the-touch sealant formulation adapted to cure upon press-fit assembly of the two parts in said grooves. Suitably the inventive article is an engine cup-plug adapted to mate with a hole in a automobile engine. Other inventive articles include tubing sections adapted to be press-fit into engine manifolds or the like to form nipples for hose connections.

BRIEF DESCRIPTION OF THE DRAWINGS

FIG. 1 is a pictorial view of a stamped metal cup-plug for an automobile engine, modified by machining a plurality of fine grooves on the outer surface thereof for receiving a preapplied sealant in accordance with the invention.

FIG. 2 is a cutaway detail of a portion of an automobile engine in which a cup-plug as in FIG. 1, coated with pre-applied sealant, has been press-fitted into a hole bored in the engine.

DESCRIPTION OF THE PREFERRED EMBODIMENT

As used herein, the term "circumferential" when used to describe the grooves, is not limited to circular grooves. Threads or other spirals are satisfactory carriers for the preapplied sealant and are preferred for manufacturing ease. A "plurality" of grooves, as used in reference to spiraled grooves such as threads, means more than one rotation of a spiral, not necessarily multiple spirals. Provided the tolerances can be maintained, knurled patterns may also be employed in the invention.

While the circumferential grooves may be located on either the male or female part, manufacturing considerations would generally prefer the male part. This is especially so with automobile engines. Because the engine blocks are large parts, the tooling for which is very expensive and not readily modified, it is impractical to alter the shape or configuration of the hole surface. Modification of the male cup-plug is much easier. However, because they are now inexpensive stampings, it would not be cost effective to replace them with carefully machined parts. Any modification of the male part should be readily accomplished on the stamping itself at low cost. Machining a closely spaced threaded groove or knurling a circumferential pattern on the exterior surface of a conventional stamped cup-plug satisfies these requirements.

Referring now to the drawings there is shown in FIGS. 1 and 2 a stamped metal cup-plug generally designated by the numeral 10. The cup-plug is sized to be press fitted into an opening in an automobile engine with a typical interference overlap of 0.006–0.012 inches. Cup-plug 10 has been modified from the conventional stamping on the exterior surface area 12 by inscribing a plurality of circumferential grooves 14 thereon. The grooves extend below the overlapping zone of the plug and engine hole, and carry a pre-applied sealant 16 therein. When the cup-plug 10 is press fitted into hole 17 of automobile engine 18, the grooves are distorted but the sealant is not sheared off. The sealant fills any microscopic voids and cures to provide a liquid and gas type assembly.

It should be understood that the figures are drawn for illustration purposes only. In particular, the depth of the grooves and the extent of distortion on assembly is not intended to be drawn to scale. Generally the grooves need only extend a very minor distance, suitably 0.0001–0.010 inches, below the overlapping area of "interference zone." The primary requirement is that the grooves be deep enough to avoid shearing off entirely during the assembly operation. Even if the distortion of the grooves during assembly is so great as to become completely filled with displaced metal, the assembly will be acceptably sealed because the displacement process will extrude sealant from the grooves into microscopic voids. It is only the total shearing off of the sealant which needs to be avoided.

The minimum number of grooves necessary for effective sealing is not especially critical and may vary according to part thickness, bore diameter, part materials, and the amount of interference between dimensions of the two parts. The maximum number of grooves which can be placed on the mating surface is only limited by the practicalities of machining. Generally, when the grooves are formed by machining a thread on the surface of one of the parts, a good result will be obtained somewhere in the range of 10–150 threads per inch, preferably 30–90 threads per inch. The angle between the opposing sides of the thread grooves may vary from about 5 degrees to 140 degrees but preferably is about 90 degrees.

The respective male and female parts may be made of any materials suitable for interference fit assembly. Generally the grooved part will be made of a malleable material such as unhardened metal or plastic. The ungrooved part may be made of the same material, but may also be harder, such as hardened steel.

Preferred sealants which may be used in the invention are sold by Loctite Corporation under the Trademark DRI-LOC and by 3M Company under the brand Scotch Grip. Other sealants may be used such as those disclosed in U.S. Pat. Nos. 3,489,599, 3,547,851, 3,625,875, 3,757,828, 3,814,156, 3,826,673, 3,922,449, 4,417,028, 4,497,916, and 4,632,944, all of which are incorporated herein by reference. When the sealant is one which relies on rupturing of microcapsules in order to initiate curing, it is generally desirable that the groove depth be kept to a minimum so as to avoid assemblies having volumes of sealant in the bottoms of grooves with few or no ruptured capsules therein.

There are some pre-applied thread-locking sealants which are not considered suitable for use in the inventive method. U.S. Pat. No. 4,081,012 discloses two part pre-applied thread-locking compositions, the two parts being applied to opposite sides of a threaded member. Such formulations rely on the rotation of the threaded parts during assembly to mix the two components. Since a press-bit does not involve rotating movement, application of a two part adhesive on opposite sides of the plug or hole is not practical in the inventive method.

The invention can be illustrated with reference to the following examples.

EXAMPLE 1

24 cup-plugs for Pontiac Motor's 2.5 Liter engine are grooved by machining 64 threads per inch on the outer mating surface of the plug. The grooves were coated with Loctite DRI-LOC ™ #201 and assembled in test engines. All plugs sealed satisfactorily and adhered well.

EXAMPLE 2

Sections from Pontiac Motor Cylinder Blocks with machine cup-plug bores, some having conventional cup-plugs already inserted and some without plugs were obtained. Although the design interference was 0.006 inches to 0.012 inches, the conventional assembly process was observed to severely sheer the plug outside diameters so that actual interference was only 0.002–0.003 inches. Push out strengths of conventional plugs using a existing liquid Loctite cup-plug sealant product were measured at 2,600–3,300 lbs.

Identical cup-plug parts were then machined with 64 threads per inch to a depth of 0.008 inches, leaving the major diameter 0.006–0.012 inches over size versus the mating bore. The parts were then coated with Loctite DRI-LOC ™ #204, a pre-applied thread locking sealant, and press-fitted into the bore. Push out loads of 4,000–4,400 lbs were obtained.

While the inventive process is advantageously employed in an automobile engine assembly, as illustrated above, it will be readily seen by those skilled in the art that the process is not so limited. The process can be readily adapted to interference fitted parts of all types. Among the other automotive devices which can be permanently assembled using the inventive method are governor tubes on transmissions, dipstick tubes, nipples for water pumps, and vacuum fittings.

Another area where the invention is useful is in bimetal assemblies, for instance the joining of aluminum and steel parts. Using compressable sealants in the grooves will make the assembly more tolerant of differential thermal expansion between the two parts. Assembling steel bearing races into aluminum housings is one such application area.

Advantages provided by the inventive method, relative to liquid adhesives, include improved housekeeping; more certainty in adhesive application; and elimination or reduction of costly wastes, dispenser down time, and contamination of critical areas of parts, such as bearings.

What is claimed is:

1. An improvement in a process comprising the step of press-fit assembling two parts, without rotation, said parts having respective mating male and female portions adapted to be press-fitted together with an interference fit wherein one of the said male or female portions has a curable sealant material thereon adapted to cure after assembly of the two parts, the improvement comprising: that one of said mating portions includes a plurality of circumferential grooves thereon, each said groove having an outer ridge dimension and an inner valley dimension, the ridge dimension of which overlaps the dimension of the other said mating portion and the valley dimension of which does not overlap the dimension of said other male or female portion; that the said sealant is carried on said grooved portion in said grooves; and that the sealant material is a pre-applied storage-stable substantially dry-to-the-touch formulation adapated to cure upon performing said press-fit assembly step on the two parts.

2. A process as in claim 1 wherein the grooved part is the part having the male mating portion.

3. A process as in claim 1 wherein the valley dimension of said grooves extends 0.0001–0.010 inches below the zone of interference between the two parts.

4. A process as in claim 1 wherein the female mating portion is a hole in an automobile engine and the part comprising the male portion is a cup-plug.

5. A process as in claim 4 wherein the cup-plug has an outer surface threaded with between 15 and 150 threads per inch to a depth of 0.001–0.010 inches below the zone of interference between the two parts, said threads comprising the said grooves.

6. An article of manufacture comprising a generally cylindrical part adapted to be press-fitted into a mating bore, the cylindrical part having a plurality of circumferential grooves thereon, the grooves having an outer dimension which overlaps the dimension of the mating bore and an inner dimension of which does not overlap the mating bore dimension, the article having a pre-applied storage-stable substantially dry-to-the-touch sealant formulation adapted to cure upon the press-fit assembly of the two parts in said grooves.

7. An article as in claim 6 which is a stamped cup-plug member adapted to mate with a hole in an automobile engine.

8. An article of manufacture comprising the assembly product of a rotation-less press-fitting of two parts having respective mating male and female portions, adapted to be press-fitted together so as to form a unitary assembly, wherein: one of said mating portions includes a plurality of curcumferential grooves thereon; each said groove has an outer ridge dimension and an inner valley dimension, the ridge dimension of which overlaps the dimension of the other said mating portion and the valley dimension of which does not overlap the dimension of the other said mating portion; said grooved mating portion has a curable sealant material in said grooves; and the sealant is a pre-applied storage-stable substantially dry-to-the-touch formulation adapted to cure upon the press-fit assembly of the two parts.

9. An article as in claim 8 wherein the said female portion is a hole in an automobile engine block and the part comprising the male portion is a stamped metal cup-plug having said grooves machined on the outer mating surface thereof.

* * * * *